United States Patent
Kohita et al.

(10) Patent No.: US 11,816,581 B2
(45) Date of Patent: Nov. 14, 2023

(54) COMPUTATION REDUCTION USING A DECISION TREE CLASSIFIER FOR FASTER NEURAL TRANSITION-BASED PARSING

(71) Applicant: International Business Machines Corporation, Armonk, NY (US)

(72) Inventors: Ryosuke Kohita, Nishishinozaki (JP); Daisuke Takuma, Nakano-ku (JP)

(73) Assignee: International Business Machines Corporation, Armonk, NY (US)

( * ) Notice: Subject to any disclaimer, the term of this patent is extended or adjusted under 35 U.S.C. 154(b) by 553 days.

(21) Appl. No.: 17/014,435

(22) Filed: Sep. 8, 2020

(65) Prior Publication Data

US 2022/0076138 A1  Mar. 10, 2022

(51) Int. Cl.
  *G06N 3/08* (2023.01)
  *G06N 5/01* (2023.01)
  *G06N 5/04* (2023.01)
  *G06N 3/04* (2023.01)
  *G06N 20/20* (2019.01)

(52) U.S. Cl.
  CPC .............. *G06N 5/01* (2023.01); *G06N 3/04* (2013.01); *G06N 3/08* (2013.01); *G06N 5/04* (2013.01); *G06N 20/20* (2019.01)

(58) Field of Classification Search
  CPC ............ G06N 5/01; G06N 5/04; G06N 20/20; G06N 3/04; G06N 3/08
  See application file for complete search history.

(56) References Cited

U.S. PATENT DOCUMENTS

2018/0121799 A1   5/2018  Hashimoto

FOREIGN PATENT DOCUMENTS

WO   2019231346 A1   12/2019

OTHER PUBLICATIONS

Basirat et al., Real-Values Syntactic Word Vectors (RSV) for Greedy Neural Dependency Parsing, Proceedings of the 21st Nordic Conference on Computational Linguistics, pp. 20-28, May 2017. (Year: 2017).*

(Continued)

*Primary Examiner* — Kamran Afshar
*Assistant Examiner* — Marshall L Werner
(74) *Attorney, Agent, or Firm* — Edward P. Li

(57) ABSTRACT

A fast neural transition-based parser. The fast neural transition-based parser includes a decision tree-based classifier and a state vector control loss function. The decision tree-based classifier is dynamically used to replace a multilayer perceptron in the fast neural transition-based parser, and the decision tree-based classifier increases speed of neural transition-based parsing. The state vector control loss function trains the fast neural transition-based parser, the state vector control loss function builds a vector space favorable for building a decision tree that is used for the decision tree-based classifier in the neural transition-based parser, and the state vector control loss function maintains accuracy of neural transition-based parsing while the decision tree-based classifier is used to increase the speed of the neural transition-based parsing while using the decision tree-based classifier to increase the speed of the neural transition-based parsing.

24 Claims, 12 Drawing Sheets

(56) References Cited

OTHER PUBLICATIONS

Jaf et al., The Selection of Classifiers for a Data-Driven Parser, The 12th International Workshop on Natural Language Processing and Cognitive Science, Sep. 2015. (Year: 2015).*
Aufrant, et al., "PanParser: a Modular Implementation for Efficient Transition-Based Dependency Parsing", The Prague Bulletin of Mathematical Linguistics, No. 111, 2018, pp. 57-86, <https://ufal.mff.cuni.cz/pbml/111/art-aufrant-wisniewski.pdf>.
Ballesteros et al., "Improved Transition-Based Parsing by Modeling Characters instead of Words with LSTMs", Proceedings of the 20th Conference on Empirical Methods in Natural Language Processing, Sep. 2015, pp. 349-359.
Bohnet, Bernd, "Very High Accuracy and Fast Dependency Parsing is not a Contradiction", Proceedings of the 23rd International Conference on Computational Linguistics, Aug. 2010, pp. 89-97.
Chen et al., "A Fast and Accurate Dependency Parser using Neural Networks", Proceedings of the 19th Conference on Empirical Methods in Natural Language Processing, Oct. 2014, pp. 740-750.
Dyer et al., "Transition-Based Dependency Parsing with Stack Long Short-Term Memory", Proceedings of the 53rd Annual Meeting of the Association for Computational Linguistics and the 7th International Joint Conference on Natural Language Processing, Jul. 2015, pp. 334-343.
Huang et al., "Bilingually-Constrained (Monolingual) Shift-Reduce Parsing", Proceedings of the 14th Conference on Empirical Methods in Natural Language Processing, Aug. 2009, pp. 1222-1231.
Kiperwasser et al., "Simple and Accurate Dependency Parsing Using Bidirectional LSTM Feature Representations", Transactions of the Association for Computational Linguistics, vol. 4, 2016, pp. 313-327.
Kulmizev et al., "Deep Contextualized Word Embeddings in Transition-Based and Graph-Based Dependency Parsing—A Tale of Two Parsers Revisited", Proceedings of the 24th Conference on Empirical Methods in Natural anguage Processing and the 9th International Joint Conference on Natural Language Processing, Nov. 2019, pp. 2755-2768.
Li, et al., "Global Greedy Dependency Parsing", arXiv:1911.08673v3, [cs.CL], Feb. 12, 2020, 9 pages, <https://arxiv.org/pdf/1911.08673.pdf>.
Mell et al., "The NIST Definition of Cloud Computing", National Institute of Standards and Technology, Special Publication 800-145, Sep. 2011, 7 pages.
Nivre, Joakim "Algorithms for Deterministic Incremental Dependency Parsing", Computational Linguistics, vol. 34, No. 4, 2008, pp. 513-553.
Nivre, Joakim, "An Efficient Algorithm for Projective Dependency Parsing", Proceedings of the 8th International Conference on Parsing Technologies, Apr. 2003, pp. 149-160.
Nivre, Joakim, "Incrementality in Deterministic Dependency Parsing", Proceedings of the Workshop on Incremental Parsing: Bringing Engineering and Cognition Together, Jul. 2004, pp. 50-57.
Yamada et al., "Statistical Dependency Analysis with Support Vector Machines", Proceedings of the 8th International Conference on Parsing Technologies, Apr. 2003, pp. 195-206.
Zeman et al., "CoNLL 2018 Shared Task: Multilingual Parsing from Raw Text to Universal Dependencies", Proceedings of the CoNLL 2018 Shared Task: Multilingual Parsing from Raw Text to Universal Dependencies, Nov. 2018, pp. 1-21.

* cited by examiner

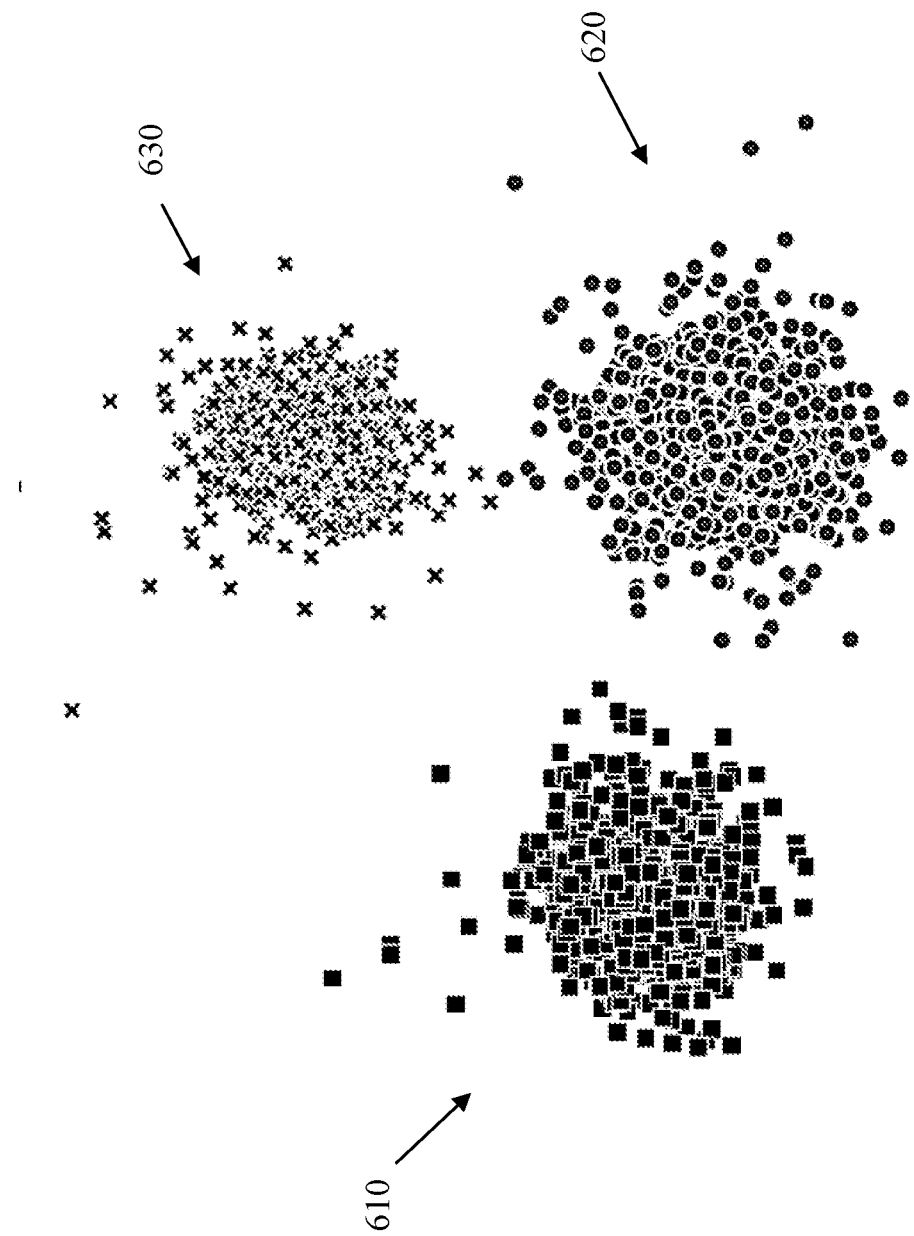

COMPUTATION REDUCTION USING A DECISION TREE CLASSIFIER FOR FASTER NEURAL TRANSITION-BASED PARSING

BACKGROUND

The present invention relates generally to neural transition-based parsing, and more particularly to a decision tree-based classifier and a state vector control loss function in a fast neural transition-based parser.

Transition-based dependency parsing is a greedy shift-reduce algorithm that builds a syntactic tree in consecutive actions. The accuracy and speed of the algorithm make for an effective text processing. Following the incorporation of a neural network, sophisticated modeling has led to further improvements in accuracy. In contrast, however, there are few studies on parsing speed when a neural network is used. To fully take the advantage of transition-based parsing, light modeling is also crucial.

Previous studies on neural transition-based parsers have focused more on improving accuracy rather than speed. Compared with the initial network, recent high performance transition-based parsers have a complex architecture which involves constructing a subtree representation, modeling a character sequence, and using a contextual embedding. Although these improvements have increased parsing accuracy, their additional computational costs may result in reduced parsing speed.

Reducing the time taken to determine an action for a state is important for faster parsing. At each step, a transition-based parser extracts a feature representation from a parser state and then predicts a probable action. Feature extraction is more efficient with a neural network because combinatorial features are expressed as computations on the network.

SUMMARY

In one aspect, a computer-implemented method for fast neural transition-based parsing is provided. The computer-implemented method includes receiving a vector representation of a state, where the vector representation is in a vector space built by a state vector control loss function in training a fast neural transition-based parser. The computer-implemented method further includes predicting a parsing action based on the vector representation, using a decision tree-based classifier in the fast neural transition-based parser. The computer-implemented method further includes calculating a Gini coefficient and a number of samples, based on the vector representation, using the decision tree-based classifier. The computer-implemented method further includes determining whether either of two conditions is met, where the two conditions are that the Gini coefficient is greater than a predetermined threshold of the Gini coefficient and the number of samples is less than a predetermined threshold of the number of samples. The computer-implemented method further includes applying the parsing action predicted by the decision tree-based classifier to the state, in response to determining that neither of the two conditions is met.

In another aspect, a computer program product for fast neural transition-based parsing is provided. The computer program product comprises a computer readable storage medium having program instructions embodied therewith, and the program instructions are executable by one or more processors. The program instructions are executable to receive a vector representation of a state, where the vector representation is in a vector space built by a state vector control loss function in training a fast neural transition-based parser; predict a parsing action based on the vector representation, using a decision tree-based classifier in the fast neural transition-based parser; calculate a Gini coefficient and a number of samples, based on the vector representation, using the decision tree-based classifier; determine whether either of two conditions is met, where the two conditions are that the Gini coefficient is greater than a predetermined threshold of the Gini coefficient and the number of samples is less than a predetermined threshold of the number of samples; apply the parsing action predicted by the decision tree-based classifier to the state, in response to determining that neither of the two conditions is met.

In yet another aspect, a computer-implemented method for fast neural transition-based parsing is provided. The computer-implemented method includes building a vector space favorable for building a decision tree that is used for a decision tree-based classifier in a fast neural transition-based parser, by a state vector control loss function in training the fast neural transition-based parser. The computer-implemented method further includes distributing, in the vector space, state vectors in a same action class close to each other, by the state vector control loss function. The computer-implemented method further includes distributing, in the vector space, centroids of state vectors in different action classes are distributed far away from each other, by the state vector control loss function. The computer-implemented method further includes gathering, in the vector space, the state vectors in the same action class into a hyperrectangle, using an $L^p$-norm and adjusting p, by the state vector control loss function.

In yet another aspect, a computer program product for fast neural transition-based parsing is provided. The computer program product comprises a computer readable storage medium having program instructions embodied therewith, and the program instructions are executable by one or more processors. The program instructions are executable to build a vector space favorable for building a decision tree that is used for a decision tree-based classifier in a fast neural transition-based parser, by a state vector control loss function in training the fast neural transition-based parser; distribute, in the vector space, state vectors in a same action class close to each other, by the state vector control loss function; distribute, in the vector space, centroids of state vectors in different action classes are distributed far away from each other, by the state vector control loss function; and gather, in the vector space, the state vectors in the same action class into a hyperrectangle, using an $L^p$-norm and adjusting p, by the state vector control loss function.

In yet another aspect, a fast neural transition-based parser is provided. The fast neural transition-based parser comprises a decision tree-based classifier. The decision tree-based classifier is dynamically used to replace a multilayer perceptron in the fast neural transition-based parser, and the decision tree-based classifier increases speed of neural transition-based parsing. The fast neural transition-based parser further comprises a state vector control loss function. The state vector control loss function trains the fast neural transition-based parser and builds a vector space favorable for building a decision tree that is used for the decision tree-based classifier. The state vector control loss function maintains accuracy of the neural transition-based parsing, while the decision tree-based classifier is used to increase the speed of the neural transition-based parsing.

BRIEF DESCRIPTION OF THE SEVERAL VIEWS OF THE DRAWINGS

FIG. 6(A), FIG. 6(B), and FIG. 6(C) present different distributions of state vectors corresponding to different p values of an $L^p$-norm in a state vector control loss function, in accordance with one embodiment of the present invention.

DETAILED DESCRIPTION

Embodiments of the present invention propose a method that integrates a fast prediction from a decision tree algorithm into a neural transition-based parser. The method increases the speed of a neural transition-based parsing while maintaining accuracy. The present invention focuses on improving an action classifier in the neural transition-based parser that predicts an action from a state representation.

The core idea of the present invention is to use a decision tree-based classifier instead of a multilayer perceptron (MLP) in the neural transition-based parser. The runtime of the decision tree algorithm is much faster than that of various classification models because its time complexity is bounded at most by tree depth. While the decision tree algorithm increases the speed of the neural transition-based parser, one concern is the loss of accuracy. The present invention addresses this concern in two ways: (1) dynamically using a decision tree prediction according to the degree of confidence and (2) controlling a state representation via an additional loss function so that the decision tree makes accurate predictions.

Figure 1:
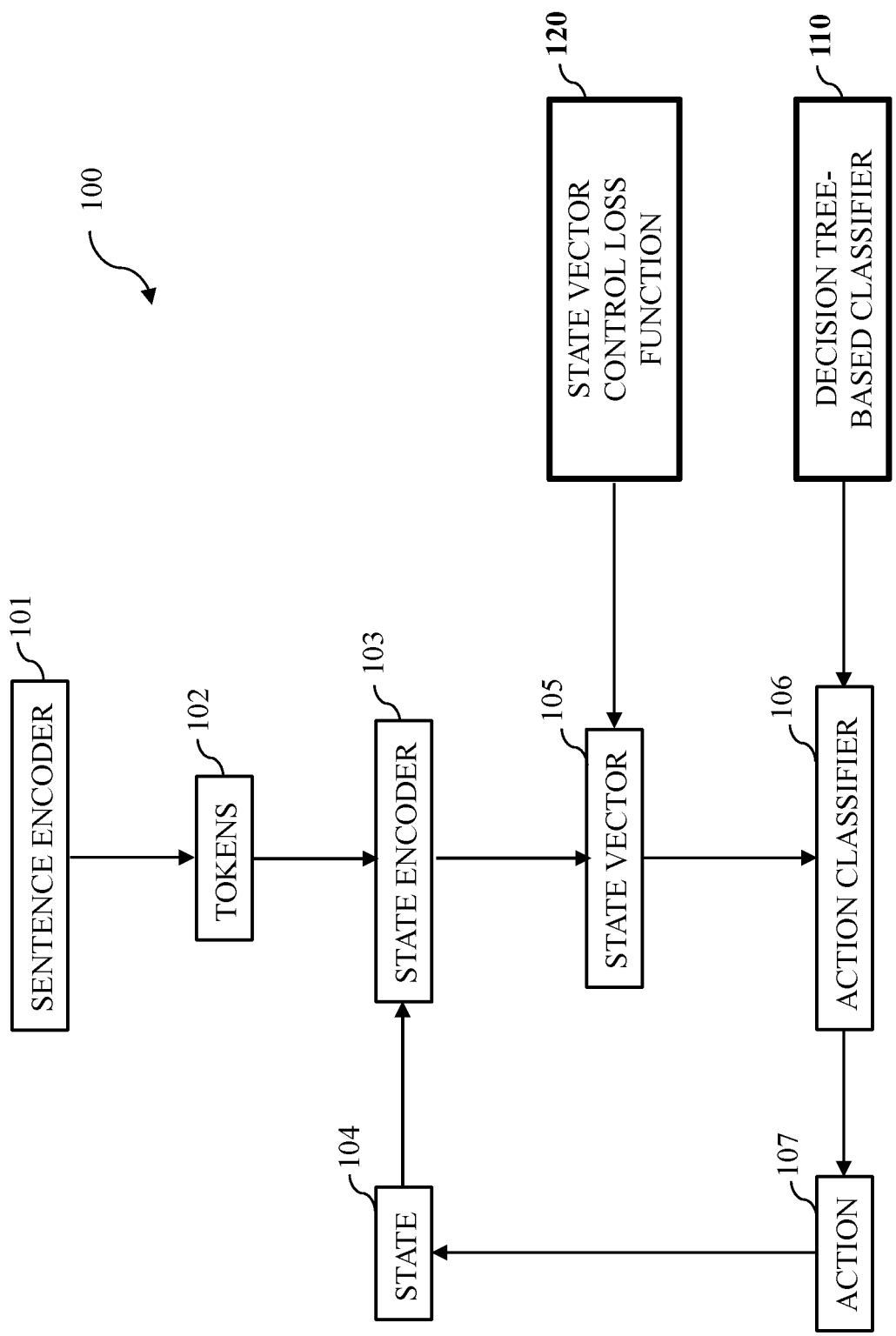
FIG. 1 is a systematic diagram illustrating a decision tree-based classifier and a state vector control loss function involved in a fast neural transition-based parser, in accordance with one embodiment of the present invention.

FIG. 1 is a systematic diagram illustrating a decision tree-based classifier 110 and a state vector control loss function 120 involved in a fast neural transition-based parser 100, in accordance with one embodiment of the present invention.

The fast neural transition-based parser 100 including the decision tree-based classifier 110 and a state vector control loss function 120 is implemented on one or more computing devices or servers. A computing device or server is described in more detail in later paragraphs with reference to FIG. 7. In another embodiment, the operational steps may be implemented on a virtual machine or another virtualization implementation being run on one or more computing devices or servers. In yet another embodiment, the operational steps may be implemented in a cloud computing environment. The cloud computing environment is described in later paragraphs with reference to FIG. 8 and FIG. 9.

The fast neural transition-based parser 100 comprises different neural networks. Generally, three different neural networks includes a sentence encoder 101, a state encoder 103, and an action classifier 106. The input of the sentence encoder 101 is a sentence and the output of the sentence encoder 101 is tokens 102. For example, bidirectional long short-term memory (BiLSTM), convolutional neural network (CNN), or Transformer is deep learning models used in the sentence encoder 101. The inputs of the state encoder 103 are the tokens 102 and a state 104, and the output of the state encoder 103 is a state vector 105. For example, a concatenation, a linear, or an attention neural network is used in the state encoder 103. The input of the action classifier 106 is the state vector 105 and the output of the action classifier 106 is action 107. For example, a multilayer perceptron (MLP), which is a class of feedforward artificial neural network (ANN), is used in the action classifier 106. The action 107 is applied to the state 104, until the state reaches a terminal configuration.

Transition-based parsing is a greedy shift-reduce parsing algorithm. A standard transition algorithm uses two data structures: stack ($\sigma$) which is for preserving syntactic subtrees and buffer ($\beta$) which is for storing tokens to be processed. Together, the stack ($\sigma$) and the buffer ($\beta$) are referred to as a state. The transition algorithm also has a set of parsing actions $A(a \in A)$ that defines the manipulation of tokens in the stack ($\sigma$) and buffer ($\beta$) The arc-standard algorithm, a basic but efficient transition algorithm, defines three actions: SHIFT (SH), LEFTARC (LA), and RIGHTARC (RA). More specifically, SH pops the next token in the buffer ($\beta$) then pushes it into the stack ($\sigma$). LA and RA create a dependency arc between top two tokens in the stack ($\sigma$); LA registers the first token as a parent of the second token, and RA registers the second token as a parent of the first token. Both LA and RA reduce the dependent token from the stack ($\sigma$) at the same time. In a transition algorithm, a parser performs one action until the state reaches a terminal configuration; the stack ($\sigma$) only has a tree root token, and the buffer ($\beta$) is empty in the case of arc-standard systems.

A transition-based parser requires a classifier (implemented with MLP) that predicts an action for a given state. The input of the classifier is the vector representation v of a state, and the output is action probabilities p(a|v). v is provided by a state encoding network that typically combines representations of the topmost tokens in $\sigma$ and $\beta$. The above neural networks are used during the transition process. Regarding the token representations in $\sigma$ and $\beta$, recent high-performance parsers statically create them through BiLSTM or Transformer before running parsing. The parser points to the token representations during the transition with respect to the current state. In a training stage, all parameters are simultaneously optimized with state and oracle action pairs extracted from a treebank.

The present invention incorporates a decision tree-based classifier (DTC) 110 and a state vector control loss function (SVCL) 120 into the neural transition-based parser 100. The decision tree-based classifier 110 provides a fast prediction, while the state vector control loss function 120 provides an accurate prediction. The decision tree-based classifier 110 is dynamically used to replace a multilayer perceptron (MLP).

The state vector control loss function 120 controls the state vector 105 for the decision tree-based classifier 110 to make robust predictions.

Figure 2:
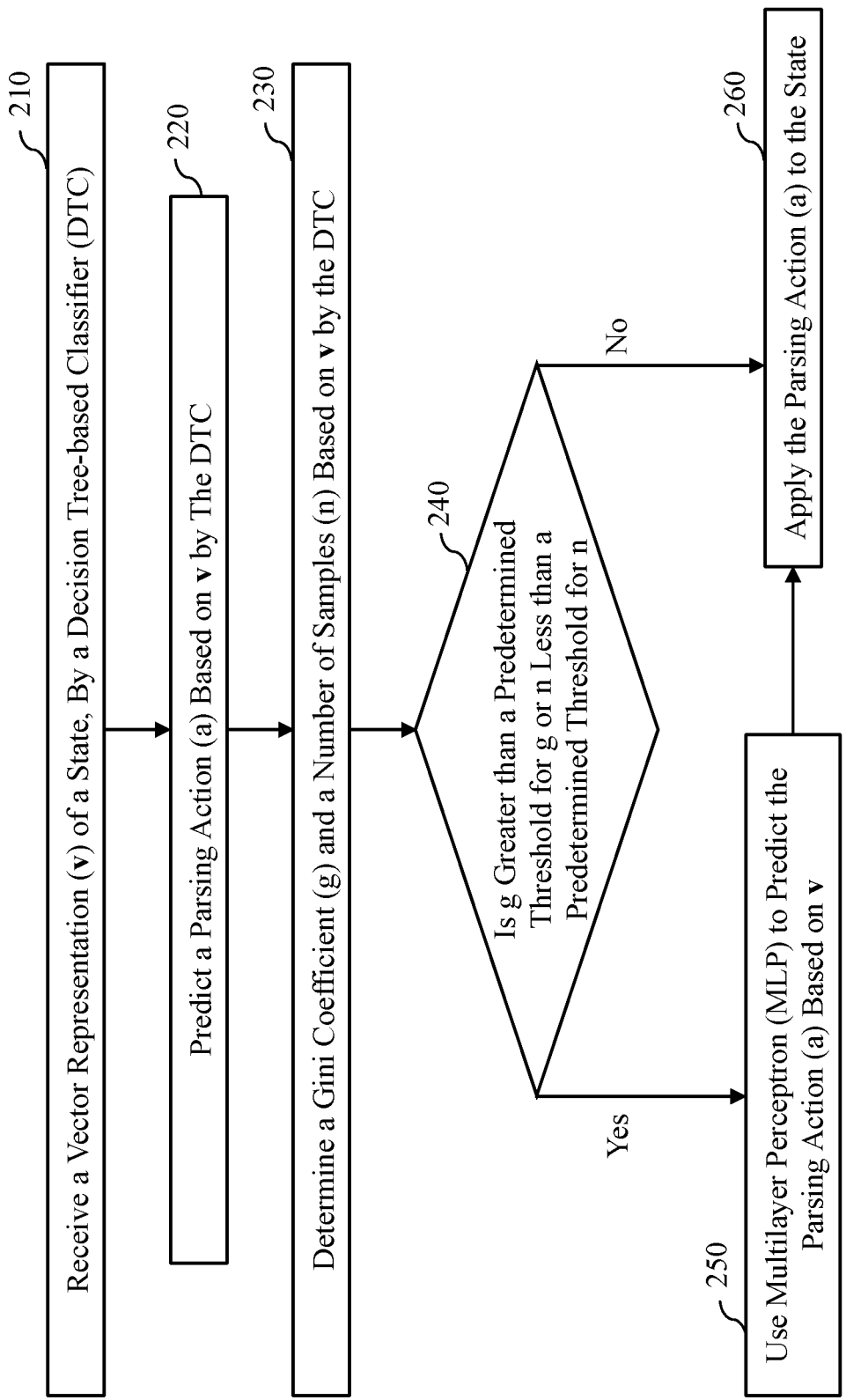
FIG. 2 presents a flowchart showing operational steps of dynamically using a decision tree-based classifier in a fast neural transition-based parser, in accordance with one embodiment of the present invention.

FIG. 2 presents a flowchart showing operational steps of dynamically using a decision tree-based classifier 110 in the fast neural transition-based parser 100, in accordance with one embodiment of the present invention.

The pseudo code of an algorithm of the decision tree-based classifier is as follows.

| | |
|---|---|
| 1: | Initialize state |
| 2: | while state is not terminal do |
| 3: | v ← State Encoder (state) |
| 4: | a, g, n ← DTC(v) |
| 5: | if g > $\tau_g$ ‖ n < $\tau_n$ then |
| 6: | a = MLP(v) |
| 7: | end if |
| 8: | apply a to state |
| 9: | end while |

At step 210, the decision tree-based classifier (DTC) receives a vector representation (v) of a state. The vector representation (v) is in a vector space built by a state vector control loss function (SVCL) in training the fast neural transition-based parser. The state vector control loss function (SVCL) builds a vector space that is favorable for building a decision tree that is used for the decision tree-based classifier (DTC).

At step 220, the decision tree-based classifier (DTC) predicts a parsing action (a) based on the vector representation (v). the decision tree-based classifier (DTC) takes the vector representation (v) as an input and predicts the parsing action by using each dimension of the vector representation (v) as features.

At step 230, the decision tree-based classifier (DTC) determines a Gini coefficient (g) and a number of samples (n) of a leaf node corresponding to a predicted value, based on the vector representation (v). The Gini coefficient (g) is for calculating information gain that is used to split a node in a decision tree algorithm. The g and n are used as criteria to determine whether the prediction made by DTC is reliable.

At step 240, the fast neural transition-based parser determines whether either of two following conditions are met: Gini coefficient (g) is greater than a predetermined threshold $\tau_g$ and the number of samples (n) is less than a predetermined threshold $\tau_n$. A smaller value of $\tau_g$ indicates that lower entropy is requested, and a greater value of $\tau_n$ indicates that more samples are requested.

Referring to the "Yes" branch of step 240, in response to determining that either of the two conditions are met (either g>$T_g$ or n<$t_n$), at step 250, the fast neural transition-based parser uses a multilayer perceptron (MLP) to predict the parsing action (a), based on the vector representation (v).

Referring to the "No" branch of step 240, in response to determining that either of the two conditions are not met (neither g>$\tau_g$ nor n<$\tau_n$), at step 260, the fast neural transition-based parser applies the parsing action (a) that is predicted by the decision tree-based classifier (DTC) to the state.

After step 250 or after the fast neural transition-based parser uses the multilayer perceptron (MLP) to predict the parsing action (a), the fast neural transition-based parser executes step 260 to apply the parsing action (a) that is predicted by the multilayer perceptron (MLP) to the state.

The decision tree-based classifier (DTC) 110 runs faster than the multilayer perceptron (MLP); however, one concern is a decrease in parsing accuracy. Since the vector representation (v) of the state and underling networks are optimized for MLP to predict the action, the vector space may not be separable with the decision tree. To reduce invalid predictions by DTC, the state vector control loss function 120 controls the vector representation (v) such that the vector representation (v) is distributed in a decision tree-friendly manner.

A learning algorithm of a decision tree draws separation hyperplanes that are orthogonal to either of the feature dimensions. The hyperplanes construct hyperrectangle regions represented as leaf nodes. The learning algorithm of a decision tree tries to determine hyperplanes so that samples in a particular region belong to the same class. Therefore, a favorable vector space for building a decision tree is one with samples of the same class gathered in a hyperrectangle form.

In training the fast neural transition-based parser 100, vector control is implemented by using the state vector control loss function (SVCL) 120. In the present invention, a training loss L(Θ) of the fast neural transition-based parser 100 is calculated as:

$$L(\Theta) = L_a(\Theta) + SVCL(\Theta)6 \qquad (1)$$

where Θ represents trainable parameters of neural networks in the fast neural transition-based parser 100, $L_a(\Theta)$ is a standard cross-entropy loss computed from action probabilities p(a|v), and SVCL(Θ) is an additional loss for controlling the state vectors. In the present invention, the state vector control loss function (SVCL) 120 builds a vector space favorable for building a decision tree that is used for the decision tree-based classifier (DTC) 110. SVCL(Θ) is designed to (1) distribute state vectors in a same class close to each other while centroids of different classes far away from each other in the vector space and (2) gather state vectors from a same class into a hyperrectangle in the vector space, by using $L^p$-norm and adjusting p.

$L^p$-norm is defined as:

$$\|x\|_p = (|x_1|^p + |x_2|^p + \ldots + |x_n|^p)^{\frac{1}{p}} \qquad (2)$$

The distance definition of $L^\infty$-norm ($\|x\|_\infty$=max{|$x_1$|, |$x_2$|, ..., |$x_n$|}, known as Chebyshev distance) is suitable for distributing state vectors in a hyperrectangle shape, which is a decision tree-friendly distribution. However, because $L^\infty$-norm is non-differentiable, the state vector control loss function (SVCL) 120 approximates $L^\infty$-norm using a larger value of p, such as p=10. With a large value of p, state vectors can be approximately distributed in a hyperrectangle shape.

Figure 3:
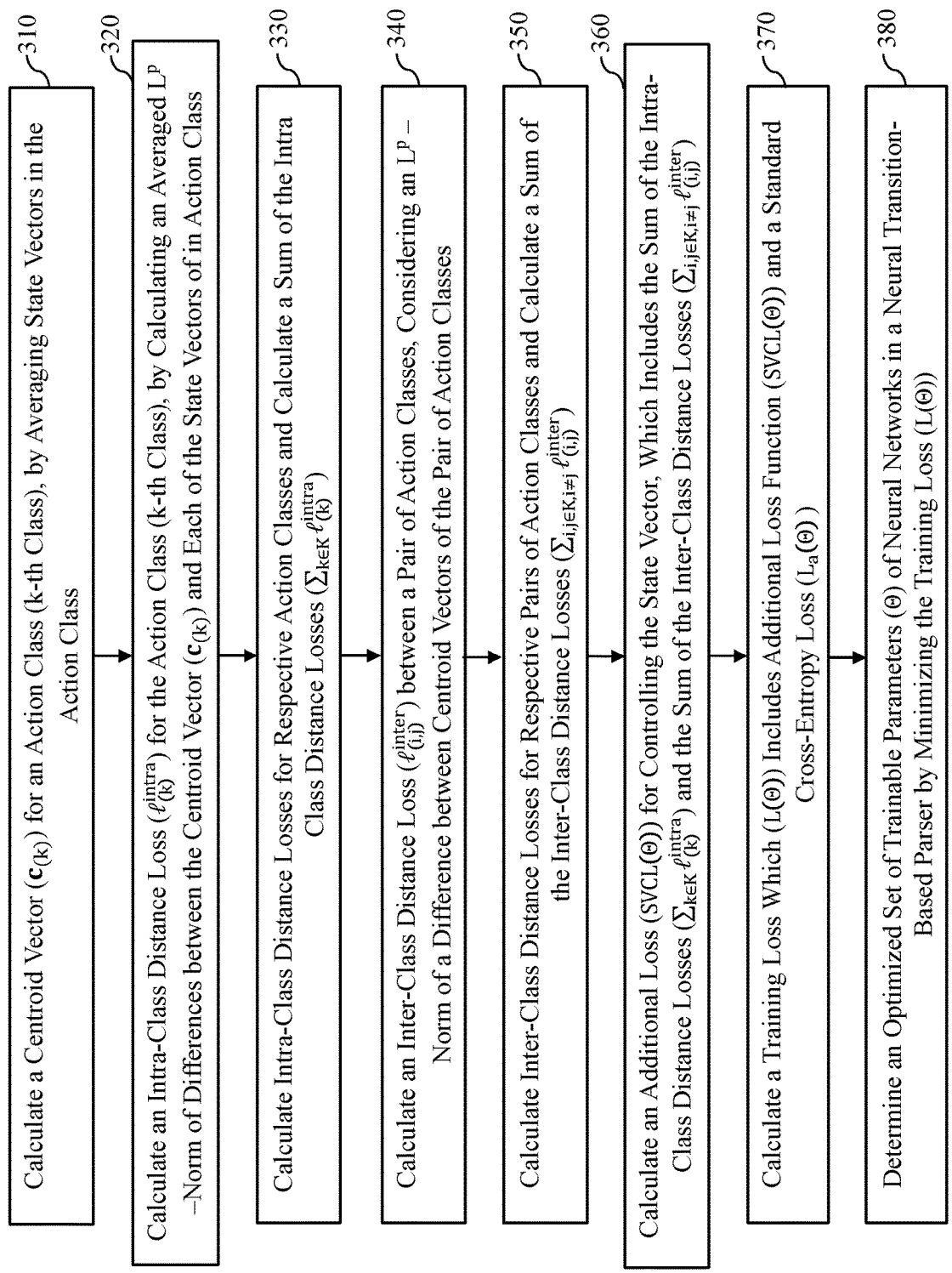
FIG. 3 presents a flowchart showing operational steps of state vector control by a state vector control loss function in training a fast neural transition-based parser, in accordance with one embodiment of the present invention.

FIG. 3 presents a flowchart showing operational steps of state vector control by a state vector control loss function 120 in training the fast neural transition-based parser 100, in accordance with one embodiment of the present invention.

Given sets of the trainable parameters (Θ) of neural networks in the fast neural transition-based parser, for each set of the trainable parameters (Θ), steps 310-360 are implemented to determine the additional loss (SVCL(Θ)) for controlling the state vectors, and step 370 is implemented to determine the training loss L(0) of the fast neural transition-based parser.

At step 310, a computing device calculates a centroid vector ($c_{(o)}$ for an action class (k-th class), by averaging state vectors in the action class. Assume there is a set of action classes K={1, 2, ..., k} and a set of state vectors $V_{(k)}=\{V_{1(k)}, V_{2(k)}, \ldots, V_{n(k)}\}$ in which $v_{i(k)}$ belongs to the class $k \in K$. The centroid vector ($c_{(k)}$) for the k-th action class is calculated by averaging the state vectors in the set of $V_{(k)}$, described as the following equation:

$$c_{(k)} = \frac{1}{n_{(k)}} \sum_{v \in V_{(k)}} v \quad (3)$$

where $n_{(k)}$ is the total number of vectors in k-th action class. Centroid vectors c are calculated for respective ones the action classes.

At step 320, the computing device calculates an intra-class distance loss for the action class (k-th class), by calculating an averaged $L^p$-norm of differences between the centroid vector ($c_{(k)}$) and each of the state vectors in the action class. The intra-class distance loss for the k-th action class is calculated by the following equation:

$$\ell_{(k)}^{intra} = \frac{1}{n_{(k)}} \sum_{v \in V_{(k)}} \|c_{(k)} - v\|_p \quad (4)$$

where $\ell_{(k)}^{intra}$ is the intra-class distance loss for the k-th action class. At step 330, the computing device calculates intra-class distance losses for respective ones of the action classes $K=\{1, 2, \ldots, k\}$ and calculates a sum of the intra-class distance losses as:

$$\text{sum of intra-class distance losses} = \sum_{k \in K} \ell_{(k)}^{intra} \quad (5)$$

At step 340, the computing device calculates an inter-class distance loss between a pair of action classes, considering an $L^p$-norm of a difference between centroid vectors of the pair of action classes. An inter-class distance loss between the i-th action class and the j-th action class ($\ell_{(i,j)}^{inter}$) is defined with a hinge loss as follows.

$$\ell_{(i,j)}^{inter} = \max\{0, m + \ell_{(i)}^{intra} - \|c_{(i)} - c_{(j)}\|_p\} \quad (6)$$

where m is a hyperparameter representing a margin. At step 350, the computing device calculates inter-class distance losses for respective pairs of action classes and calculates a sum of the inter-class distance losses as $$\text{sum of inter-class distance losses} = \sum_{i,j \in K, i \neq j} \ell_{(i,j)}^{inter} \quad (7)$$

Figure 4:
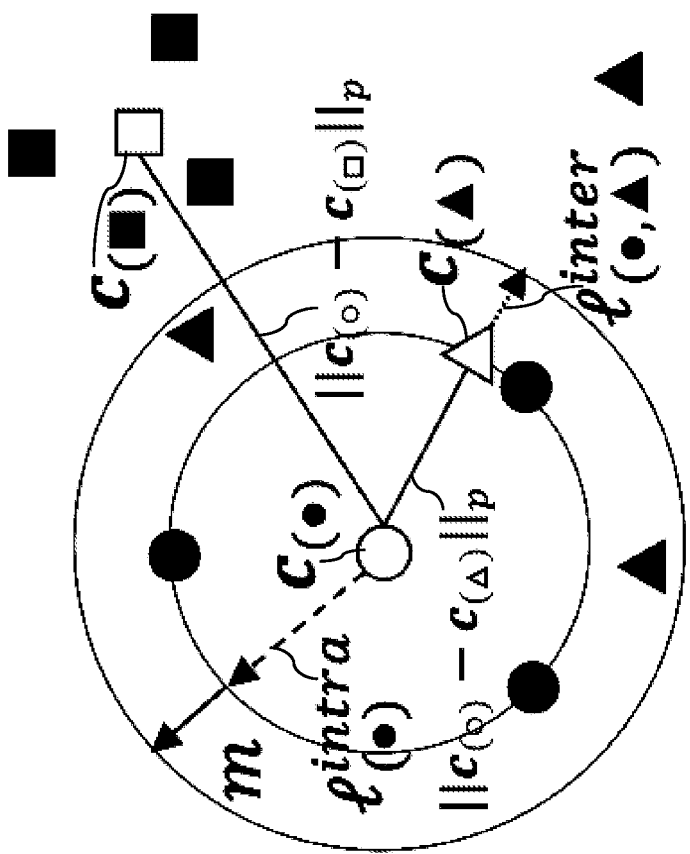
FIG. 4 is a diagram presenting a geographic illustration of intra-class distance losses and inter-class distance losses calculated by a state vector control loss function, in accordance with one embodiment of the present invention.

An example of the intra-class distance loss and the inter-class distance loss is illustrated in FIG. 4. FIG. 4 shows the centroid vector $c_{(\bullet)}$ of class ●, and the centroid vector $c_{(\bullet)}$ is indicated by ○ in FIG. 4. FIG. 4 shows the centroid vector $c_{(\blacksquare)}$ of class ■, and the centroid vector $c_{(\blacksquare)}$ is indicated by □ in FIG. 4. FIG. 4 shows the centroid vector $c_{(\blacktriangle)}$ of class ▲, and the centroid vector $c_{(\blacktriangle)}$ is indicated by △ in FIG. 4. FIG. 4 shows the intra-class distance loss $\ell_{(\bullet)}^{intra}$ for class ● and also shows the inter-class distance loss between class ● and class ▲. FIG. 4 shows $L^p$-norm of a difference between centroid vectors of classes ● and ■: $\|c_{(\circ)} - c_{(\square)}\|_p$. FIG. 4 shows $L^p$-norm of a difference between centroid vectors of classes ● and ▲: $\|c_{(\circ)} - c_{(\triangle)}\|_p$.

Referring back to FIG. 3, at step 360, the computing device calculates the additional loss SVCL(Θ) for controlling the state vectors. SVCL(Θ) is calculated as:

$$SVCL(\Theta) = \sum_{k \in K} \ell_{(k)}^{intra} + \sum_{i,j \in K, i \neq j} \ell_{(i,j)}^{inter} \quad (8)$$

The first term of equation (8) is the sum of the intra-class distance losses calculated at step 330, while the second term is the sum of the inter-class distance losses calculated at step 350.

At step 370, the computing device calculates the training loss (L(Θ)) of the fast neural transition-based parser. As described previously, the training loss includes the standard cross-entropy loss $L_a(\Theta)$ and the additional loss SVCL(Θ) for controlling the state vector. The additional loss SVCL(Θ) is calculated at step 360. The calculation of the training loss (L(Θ)) is described by equation (1).

At step 380, the computing device determines an optimized set of trainable parameters (Θ) of the neural networks in the neural transition-based parser by minimizing the training loss (L(Θ)).

Figure 5A:
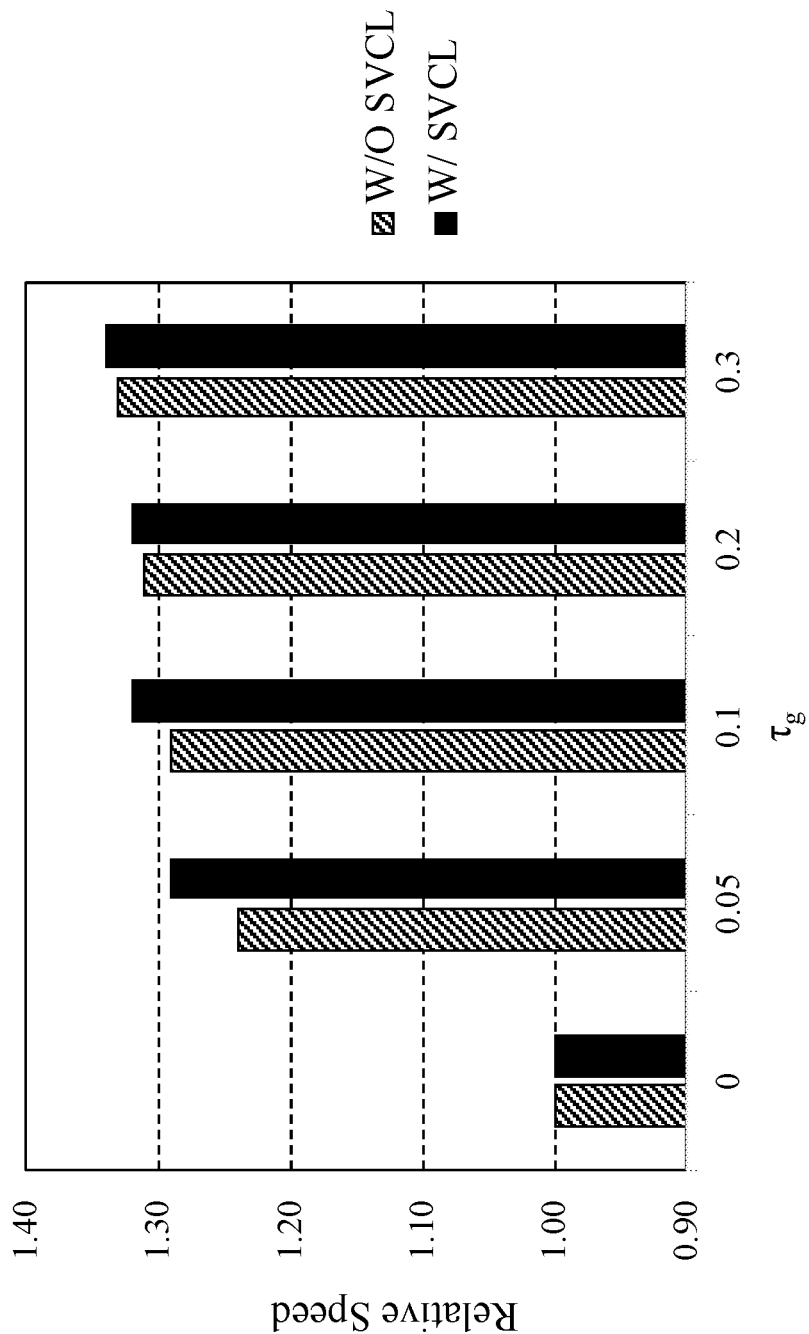
FIG. 5(A) and FIG. 5(B) present experimental results of dynamically using a decision tree-based classifier and using a state vector control loss function, in accordance with one embodiment of the present invention.
Figure 5B:
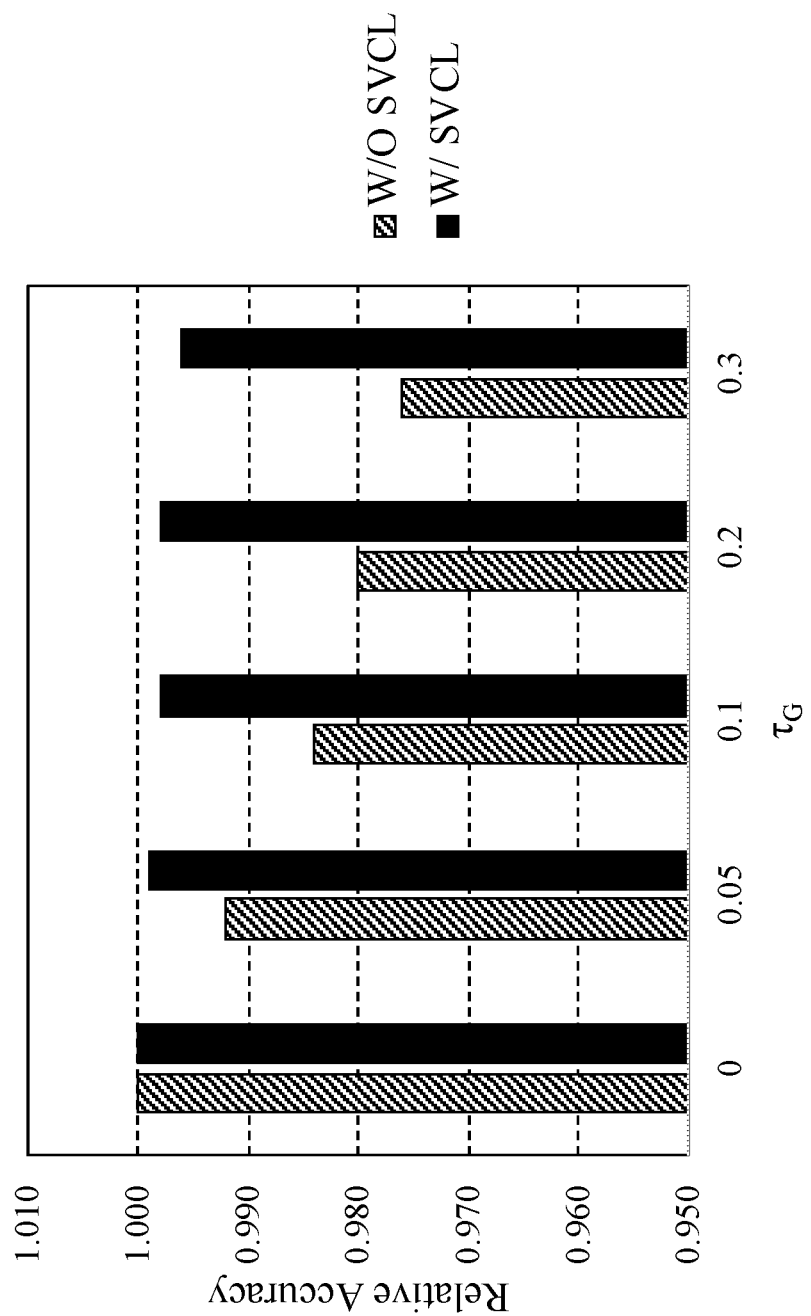

Experiments were conducted to determine whether the present invention increases parsing speed while preventing loss of accuracy. FIG. 5(A) and FIG. 5(B) present experimental results of dynamically using a decision tree-based classifier (DTC) 110 and using a state vector control loss function (SVCL) 120, in accordance with one embodiment of the present invention. FIG. 5(A) and FIG. 5(B) show experimental results of different tests with different values of $\tau_g$ (0, 0.05, 0.1, 0.2, and 0.3). Higher values of $\tau_g$ means more use of the decision tree-based classifier. $\tau_g=0$ indicates that no decision tree-based classifier (DTC) is used.

FIG. 5(A) shows relative speed for the different tests. In the experiments, to evaluate speed, overall parsing speed in the number of characters processed in a second (kchar/sec) was measured. Based on data of the overall parsing speed, the relative speed of the test with $\tau_g=0$ or no decision tree-based classifier (DTC) being used was defined as 1; and the relative speed of other tests with $\tau_g=0.05$, 0.1, 0.2, and 0.3 was relative to the relative speed of the test with $\tau_g=0$. In the experiments, two model variants, with or without SVCL, were compared. The results in FIG. 5(A) show that DTC increased parsing speed about 30% for the overall kchar/sec no matter whether SVCL was used, compared with the test with $\tau_g=0$ that always used MLP.

FIG. 5(B) shows relative accuracy for the different tests. In the experiments, to evaluate accuracy of parsing, an unlabeled attachment score (UAS) was calculated for each of the different tests. Based on calculation of UAS, the relative accuracy of the test with $\tau_g=0$ or no decision tree-based classifier (DTC) being used was defined as 1; and the relative accuracy of other tests with $\tau_g=0.05$, 0.1, 0.2, and 0.3 was relative to the accuracy of the test with $\tau_g=0$. In the experiments, two model variants, with or without SVCL, were compared. The results in FIG. 5(B) show that the relative accuracy of a test with $\tau_g=0$ (or no DTC) and with SVCL was nearly identical to the accuracy of a test with $\tau_g=0$ (or no DTC) and without SVCL. The results in FIG. 5(B) further show that the accuracy of tests without SVCL dropped as DTC usage increased. In contrast, as shown in FIG. 5(B), the accuracy of tests with SVCL dropped slightly as DTC usage increased. Most importantly, the results in FIG. 5(B) show that the accuracy of tests without SVCL is lower that the accuracy of tests with SVCL in the tests with $\tau_g$=0.05, 0.1, 0.2, and 0.3. In summary, SVCL successfully manipulated the state representation or vector so that the state representation or vector was in a decision-tree-friendly manner.

Figure 6A:
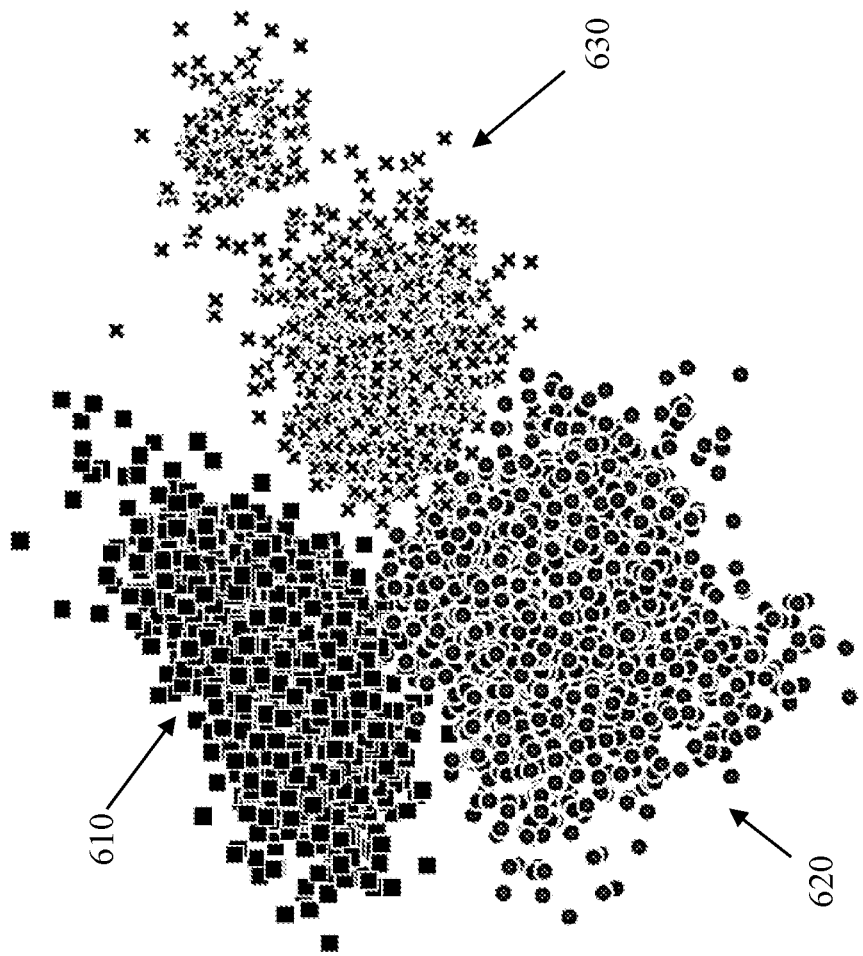
Figure 6B:
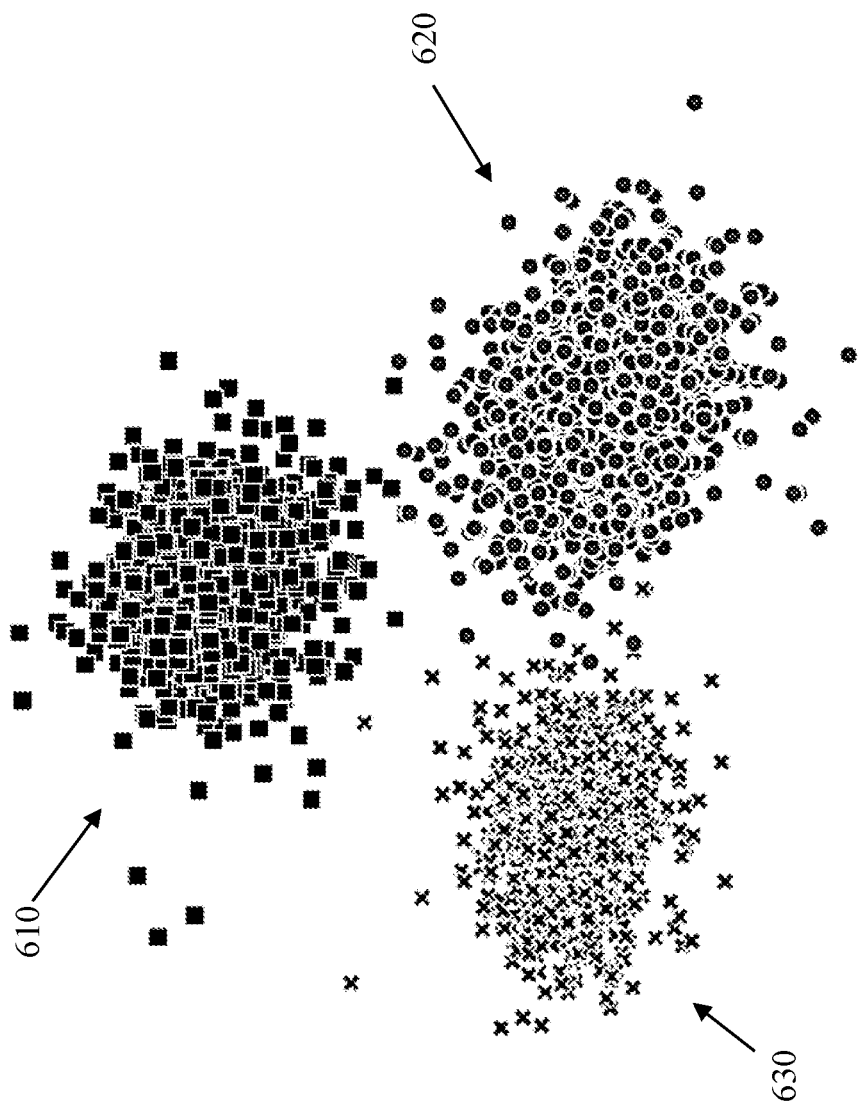

FIG. 6(A), FIG. 6(B), and FIG. 6(C) present different distributions of state vectors corresponding to different p values of an $L^p$-norm in the state vector control loss function (SVCL) 120, in accordance with one embodiment of the present invention. FIG. 6(A) presents distributions of state vectors trained with two-dimensions in a test without SVCL, showing three classes 610, 620, and 630. Without SVCL, classes 610, 620, and 630 were not condensed clusters. FIG. 6(B) presents distributions of state vectors trained with two-dimensions in a test with SVCL and p=2 (Euclidean distance), showing three classes 610, 620, and 630 which became condenser and far way from each other. FIG. 6(C) presents distributions of state vectors trained with two-dimensions in a test with SVCL and p=10, showing three classes 610, 620, and 630 which became further condenser and far way from each other. The distributions of state vectors in the tests with SVCL had more condensed clusters, and, in particular, the distributions in the test with p=10 was more optimal for the decision tree. Thus, an $L^p$-norm with a larger p value in SVCL distributes state vectors in a same class close to each other and distributes centroids of different classes far away from each other.

Figure 7:
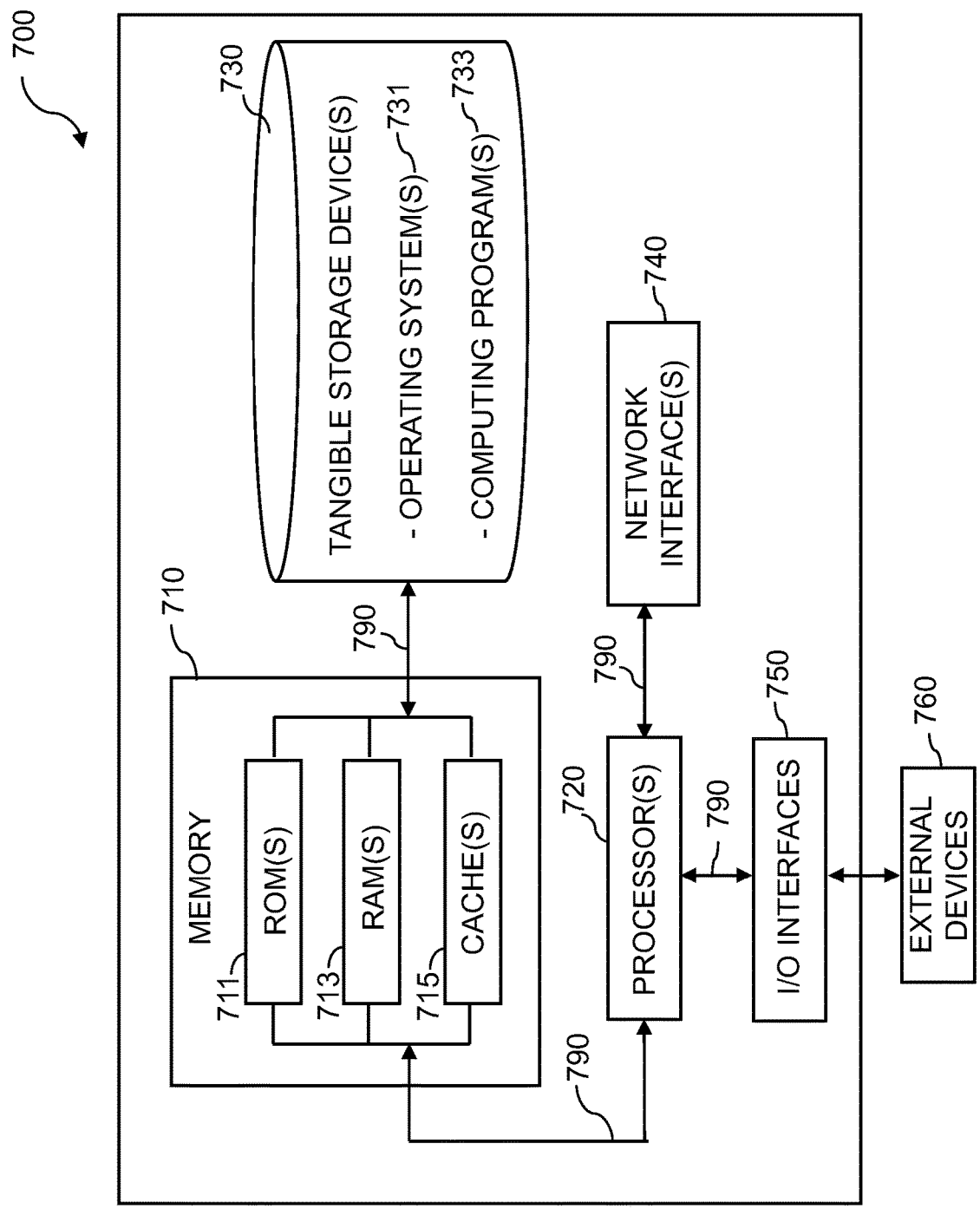
FIG. 7 is a diagram illustrating components of a computing device or server, in accordance with one embodiment of the present invention.

FIG. 7 is a is a diagram illustrating components of a computing device or server, in accordance with one embodiment of the present invention. It should be appreciated that FIG. 7 provides only an illustration of one implementation and does not imply any limitations with regard to the environment in which different embodiments may be implemented.

Referring to FIG. 7, computing device or server 700 includes processor(s) 720, memory 710, and tangible storage device(s) 730. In FIG. 7, communications among the above-mentioned components of computing device or server 700 are denoted by numeral 790. Memory 710 includes ROM(s) (Read Only Memory) 711, RAM(s) (Random Access Memory) 713, and cache(s) 715. One or more operating systems 731 and one or more computer programs 733 reside on one or more computer readable tangible storage device(s) 730.

Computing device or server 700 further includes I/O interface(s) 750. I/O interface(s) 750 allows for input and output of data with external device(s) 760 that may be connected to computing device or server 700. Computing device or server 700 further includes network interface(s) 740 for communications between computing device or server 700 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
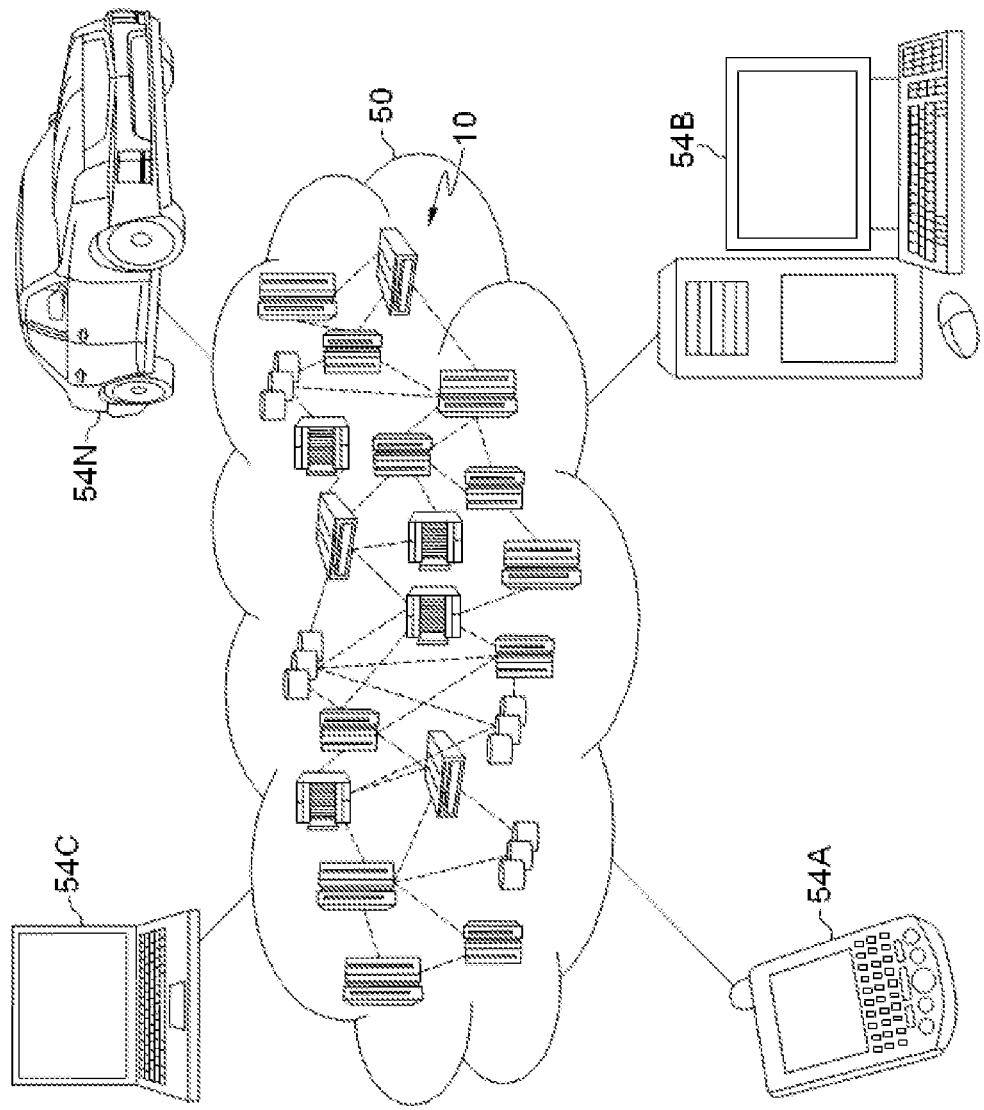
FIG. 8 depicts a cloud computing environment, in accordance with one embodiment of the present invention.

Referring now to FIG. 8, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 9:
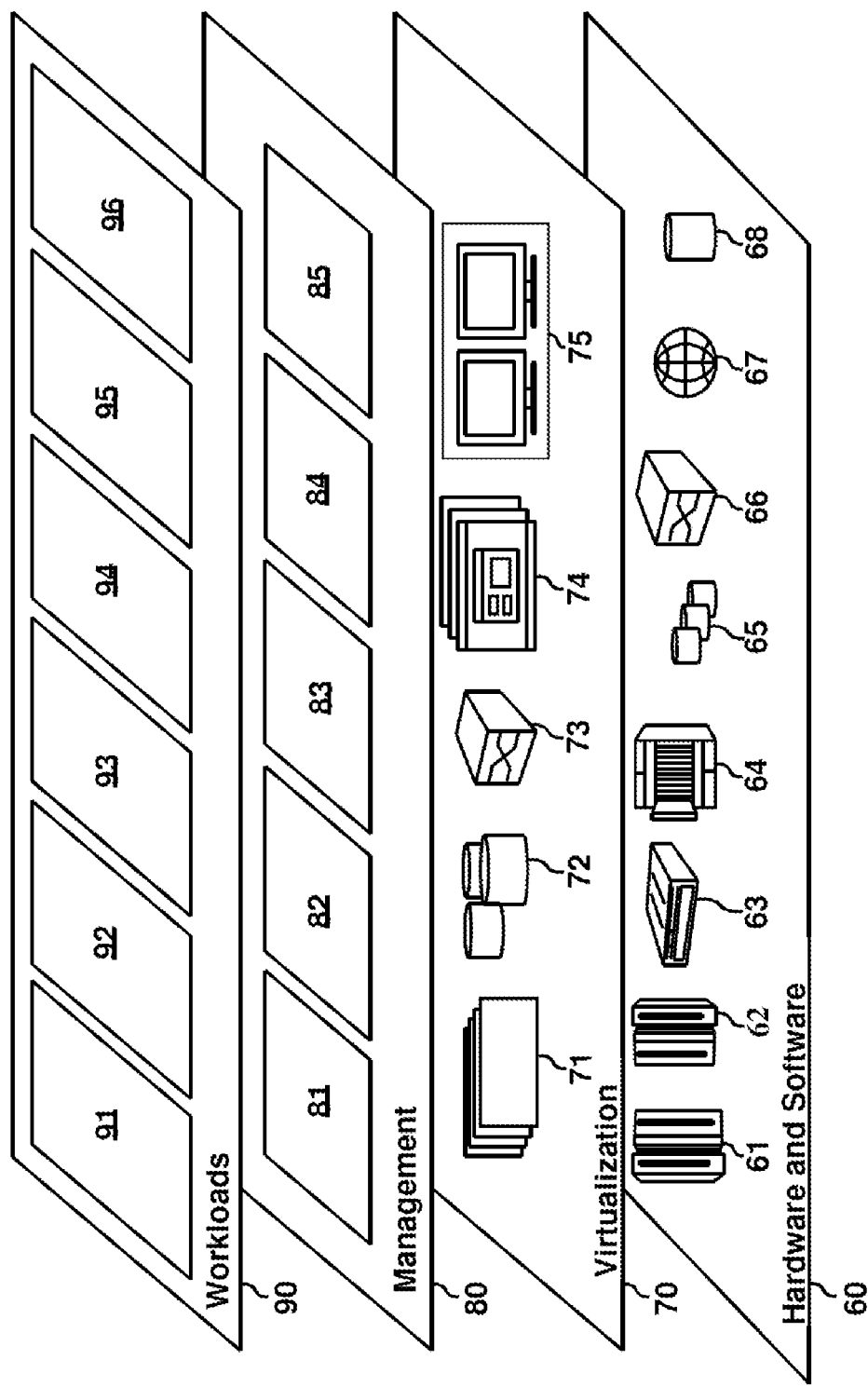
FIG. 9 depicts abstraction model layers in a cloud computing environment, in accordance with one embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of the fast neural transition-based parser 100 including the decision tree-based classifier 110 and a state vector control loss function 120 (shown in FIG. 1) in a cloud computing environment.

What is claimed is:

1. A computer-implemented method for using a neural transition-based parser to parse a sentence, the method comprising:
    training, by a server, the neural transition-based parser by clustering state vectors, distributing centroids of the state vectors, gathering the state vectors in a same action class into a hyperrectangle, and determining, based on a set of action classes, an optimized set of trainable parameters of the neural transition-based parser;
    receiving, by the server, a vector representation of a state of parsing the sentence, the vector representation being in a vector space built by a state vector control loss function in training the neural transition-based parser;
    predicting, by the server, by using a decision tree-based classifier in the neural transition-based parser, a parsing action based on the vector representation;
    calculating, by the server, by using the decision tree-based classifier, a Gini coefficient and a number of samples, based on the vector representation;
    determining, by the server, whether either of two conditions is met, the two conditions being that the Gini coefficient is greater than a predetermined threshold of the Gini coefficient and the number of samples is less than a predetermined threshold of the number of samples; and
    in response to determining that neither of the two conditions is met, applying, by the server, the parsing action predicted by the decision tree-based classifier to the state of parsing the sentence by using the neural transition-based parser.

2. The computer-implemented method of claim 1, further comprising:
    in response to determining that either of the two conditions is met, using, by the server, a multilayer perceptron in the neural transition-based parser to predict the parsing action based on the vector representation; and
    applying, by the server, the parsing action predicted by the multilayer perceptron to the state of parsing the sentence by using the neural transition-based parser.

3. The computer-implemented method of claim 1, wherein the vector space is built by the state vector control loss function such that the state vectors in the same action class are clustered and the centroids of the state vectors are distributed in different action classes.

4. The computer-implemented method of claim 1, wherein the vector space is built by the state vector control loss function such that the vector space is for building a decision tree that is used for the decision tree-based classifier and the state vectors in the same action class are gathered into the hyperrectangle by using an $L^p$-norm and adjusting p.

5. The computer-implemented method of claim 1, wherein, with each of given sets of trainable parameters of neural networks in the neural transition-based parser, training the neural transition-based parser comprises:
calculating, by the server, a centroid vector for an action class by averaging the state vectors in the action class;
calculating, by the server, an intra-class distance loss for the action class by calculating an averaged $L^p$-norm of distances between the centroid vector and each of the state vectors in the action class;
calculating, by the server, intra-class distance losses for respective action classes and a sum of the intra-class distance losses;
calculating, by the server, an inter-class distance loss between a pair of action classes by considering an $L^p$-norm of a difference between centroid vectors of the pair of action classes;
calculating, by the server, inter-class distance losses for respective pairs of action classes and a sum of the inter-class distance losses;
calculating, by the server, an additional loss, which includes the sum of the intra-class distance losses and the sum of the inter-class distance losses; and
calculating, by the server, a training loss of the neural transition-based parser, which includes the additional loss and a standard cross-entropy loss, wherein the standard cross-entropy loss is computed from action probabilities.

6. The computer-implemented method of claim 5, further comprising:
determining, by the server, the optimized set of trainable parameters by minimizing the training loss.

7. A computer program product for using a neural transition-based parser to parse a sentence, the computer program product comprising a computer readable storage medium having program instructions embodied therewith, the program instructions executable by one or more processors, the program instructions executable to:
train, by a server, the neural transition-based parser by clustering state vectors, distributing centroids of the state vectors, gathering the state vectors in a same action class into a hyperrectangle, and determining, based on a set of action classes, an optimized set of trainable parameters of the neural transition-based parser;
receive, by the server, a vector representation of a state of parsing the sentence, the vector representation being in a vector space built by a state vector control loss function in training the neural transition-based parser;
predict, by the server, by using a decision tree-based classifier in the neural transition-based parser, a parsing action based on the vector representation;
calculate, by the server, by using the decision tree-based classifier, a Gini coefficient and a number of samples, based on the vector representation;
determine, by the server, whether either of two conditions is met, the two conditions being that the Gini coefficient is greater than a predetermined threshold of the Gini coefficient and the number of samples is less than a predetermined threshold of the number of samples; and
in response to determining that neither of the two conditions is met, apply, by the server, the parsing action predicted by the decision tree-based classifier to the state of parsing the sentence by using the neural transition-based parser.

8. The computer program product of claim 7, further comprising the program instructions executable to:
in response to determining that either of the two conditions is met, use, by the server, a multilayer perceptron in the neural transition-based parser to predict the parsing action based on the vector representation; and
apply, by the server, the parsing action predicted by the multilayer perceptron to the state of parsing the sentence by using the neural transition-based parser.

9. The computer program product of claim 7, wherein the vector space is built by the state vector control loss function such that state vectors in the same action class are clustered and the centroids of the state vectors are distributed in different action classes.

10. The computer program product of claim 7, wherein the vector space is built by the state vector control loss function such that the vector space is for building a decision tree that is used for the decision tree-based classifier and the state vectors in the same action class are gathered into the hyperrectangle by using an $L^p$-norm and adjusting p.

11. The computer program product of claim 7, for training the neural transition-based parser with each of given sets of trainable parameters of neural networks in the neural transition-based parser, further comprising the program instructions executable to:
calculate, by the server, a centroid vector for an action class by averaging the state vectors in the action class;
calculate, by the server, an intra-class distance loss for the action class by calculating an averaged $L^p$-norm of distances between the centroid vector and each of the state vectors in the action class;
calculate, by the server, intra-class distance losses for respective action classes and a sum of the intra-class distance losses;
calculate, by the server, an inter-class distance loss between a pair of action classes by considering an $L^p$-norm of a difference between centroid vectors of the pair of action classes;
calculate, by the server, inter-class distance losses for respective pairs of action classes and a sum of the inter-class distance losses;
calculate, by the server, an additional loss, which includes the sum of the intra-class distance losses and the sum of the inter-class distance losses; and;
calculate, by the server, a training loss of the neural transition-based parser, which includes the additional loss and a standard cross-entropy loss, wherein the standard cross-entropy loss is computed from action probabilities.

12. The computer program product of claim 11, further comprising program instructions executable to:
determine, by the server, the optimized set of trainable parameters by minimizing the training loss.

13. A computer-implemented method for training a neural transition-based parser, the method comprising:
building, by a server, by using a state vector control loss function in training the neural transition-based parser, a vector space for building a decision tree that is used for a decision tree-based classifier in the neural transition-based parser to parse the sentence;
clustering, by the server, by using the state vector control loss function, in the vector space, state vectors in a same action class;

distributing, by the server, by using the state vector control loss function, in the vector space, centroids of state vectors in different action classes;

gathering, by the server, by using an IU-norm and adjusting p and the state vector control loss function, in the vector space, the state vectors in the same action class into a hyperrectangle; and determining, based on a set of action classes, an optimized set of trainable parameters of the neural transition-based parser.

14. The computer-implemented method of claim 13, wherein, with each of given sets of trainable parameters of neural networks in the neural transition-based parser, training the neural transition-based parser comprises:

calculating, by the server, a centroid vector for an action class by averaging state vectors in the action class;

calculating, by the server, an intra-class distance loss for the action class by calculating an averaged $L^p$-norm of distances between the centroid vector and each of the state vectors in the action class;

calculating, by the server, intra-class distance losses for respective action classes and a sum of the intra-class distance losses;

calculating, by the server, an inter-class distance loss between a pair of action classes by considering an $L^p$-norm of a difference between centroid vectors of the pair of action classes;

calculating, by the server, inter-class distance losses for respective pairs of action classes and a sum of the inter-class distance losses;

calculating, by the server, an additional loss, which includes the sum of the intra-class distance losses and the sum of the inter-class distance losses; and calculating, by the server, a training loss of the neural transition-based parser, which includes the additional loss and a standard cross-entropy loss, wherein the standard cross-entropy loss is computed from action probabilities.

15. The computer-implemented method of claim 14, further comprising:

determining, by the server, the optimized set of trainable parameters by minimizing the training loss.

16. The computer-implemented method of claim 13, wherein using the neural transition-based parser to parse the sentence comprises:

receiving, by the server, a vector representation of a state of parsing the sentence, the vector representation being in the vector space built by the state vector control loss function in training the neural transition-based parser;

predicting, by the server, by using the decision tree-based classifier in the neural transition-based parser, a parsing action based on the vector representation;

calculating, by the server, by using the decision tree-based classifier, a Gini coefficient and a number of samples, based on the vector representation;

determining, by the server, whether either of two conditions is met, the two conditions being that the Gini coefficient is greater than a predetermined threshold of the Gini coefficient and the number of samples is less than a predetermined threshold of the number of samples;

in response to determining that neither of the two conditions is met, applying, by the server, the parsing action predicted by the decision tree-based classifier to the state of parsing the sentence by using the neural transition-based parser; and in response to determining that either of the two conditions is met, using, by the server, a multilayer perceptron in the neural transition-based parser to predict the parsing action based on the vector representation, and applying, by the server, the parsing action predicted by the multilayer perceptron to the state of parsing the sentence by using the neural transition-based parser.

17. A computer program product for training a neural transition-based parser, the computer program product comprising a computer readable storage medium having program instructions embodied therewith, the program instructions executable by one or more processors, the program instructions executable to:

build, by a server, by using a state vector control loss function in training the neural transition-based parser, a vector space for building a decision tree that is used for a decision tree-based classifier in the neural transition-based parser to parse the sentence;

cluster, by the server, by using the state vector control loss function, in the vector space, state vectors in a same action class;

distribute, by the server, by using the state vector control loss function, in the vector space, centroids of state vectors in different action classes;

gather, by the server, by using an L-norm and adjusting p and the state vector control loss function, in the vector space, the state vectors in the same action class into a hyperrectangle; and determine, based on a set of action classes, an optimized set of trainable parameters of the neural transition-based parser.

18. The computer program product of claim 17, for training the neural transition-based parser with each of given sets of trainable parameters of neural networks in the neural transition-based parser, further comprising the program instructions executable to:

calculate, by the server, a centroid vector for an action class by averaging state vectors in the action class;

calculate, by the server, an intra-class distance loss for the action class by calculating an averaged $L^p$-norm of distances between the centroid vector and each of the state vectors in the action class;

calculate, by the server, intra-class distance losses for respective action classes and a sum of the intra-class distance losses;

calculate, by the server, an inter-class distance loss between a pair of action classes by considering an $L^p$-norm of a difference between centroid vectors of the pair of action classes;

calculate, by the server, inter-class distance losses for respective pairs of action classes and a sum of the inter-class distance losses;

calculate, by the server, an additional loss, which includes the sum of the intra-class distance losses and the sum of the inter-class distance losses; and;

calculate, by the server, a training loss of the neural transition-based parser, which includes the additional loss and a standard cross-entropy loss, wherein the standard cross-entropy loss is computed from action probabilities.

19. The computer program product of claim 18, further comprising the program instructions executable to:

determine, by the server, the optimized set of trainable parameters by minimizing the training loss.

20. The computer program product of claim 17, for using the neural transition-based parser to parse the sentence, further comprising the program instructions executable to:

receive, by the server, a vector representation of a state of parsing the sentence, the vector representation being in the vector space built by the state vector control loss function in training the neural transition-based parser;

predict, by the server, by using the decision tree-based classifier in the neural transition-based parser, a parsing action based on the vector representation;

calculate, by the server, by using the decision tree-based classifier, a Gini coefficient and a number of samples, based on the vector representation;

determine, by the server, whether either of two conditions is met, the two conditions being that the Gini coefficient is greater than a predetermined threshold of the Gini coefficient and the number of samples is less than a predetermined threshold of the number of samples;

in response to determining that neither of the two conditions is met, apply, by the server, the parsing action predicted by the decision tree-based classifier to the state of parsing the sentence by using the neural transition-based parser; and in response to determining that either of the two conditions is met, use, by the server, a multilayer perceptron in the neural transition-based parser to predict the parsing action based on the vector representation and apply, by the server, the parsing action predicted by the multilayer perceptron to the state of parsing the sentence by using the neural transition-based parser.

21. A computer system for using a neural transition-based parser to parse a sentence, the computer system comprising one or more processors, one or more computer readable tangible storage devices, and program instructions stored on at least one of the one or more computer readable tangible storage devices for execution by at least one of the one or more processors, the program instructions executable to:

train, by a server, the neural transition-based parser by clustering state vectors, distributing centroids of the state vectors, gathering the state vectors in a same action class into a hyperrectangle, and determining, based on a set of action classes, an optimized set of trainable parameters of the neural transition-based parser;

receive, by the server, a vector representation of a state of parsing the sentence, the vector representation being in a vector space built by a state vector control loss function in training the neural transition-based parser;

predict, by the server, by using a decision tree-based classifier in the neural transition-based parser, a parsing action based on the vector representation;

calculate, by the server, by using the decision tree-based classifier, a Gini coefficient and a number of samples, based on the vector representation;

determine, by the server, whether either of two conditions is met, the two conditions being that the Gini coefficient is greater than a predetermined threshold of the Gini coefficient and the number of samples is less than a predetermined threshold of the number of samples; and in response to determining that neither of the two conditions is met, apply, by the server, the parsing action predicted by the decision tree-based classifier to the state of parsing the sentence by using the neural transition-based parser.

22. The computer system of claim 21, further comprising the program instruction executable to:

in response to determining that either of the two conditions is met, use, by the server, a multilayer perceptron to predict the parsing action based on the vector representation; and apply, by the server, the parsing action predicted by the multilayer perceptron to the state of parsing the sentence by using the neural transition-based parser.

23. The computer system of claim 21, wherein the vector space is built by the state vector control loss function such that state vectors in the same action class are clustered and the centroids of the state vectors are distributed in different action classes, wherein the vector space is built by the state vector control loss function such that the state vectors in the same action class are shaped gathered into the hyperrectangle by using an $L^p$-norm and adjusting p.

24. The computer system of claim 21, for training the neural transition-based parser with each of given sets of trainable parameters of neural networks in the neural transition-based parser, further comprising the program instruction executable to:

calculate, by the server, a centroid vector for an action class by averaging state vectors in the action class;

calculate, by the server, an intra-class distance loss for the action class by calculating an averaged LP-norm of distances between the centroid vector and each of the state vectors in the action class;

calculate, by the server, intra-class distance losses for respective action classes and a sum of the intra-class distance losses;

calculate, by the server, an inter-class distance loss between a pair of action classes by considering an LP-norm of a difference between centroid vectors of the pair of action classes;

calculate, by the server, inter-class distance losses for respective pairs of action classes and a sum of the inter-class distance losses;

calculate, by the server, an additional loss, which includes the sum of the intra-class distance losses and the sum of the inter-class distance losses;

calculate, by the server, a training loss of the neural transition-based parser, which includes the additional loss and a standard cross-entropy loss, wherein the standard cross-entropy loss is computed from action probabilities; and determine, by the server, the optimized set of trainable parameters by minimizing the training loss.

* * * * *